United States Patent
Lai et al.

(10) Patent No.: US 11,606,278 B2
(45) Date of Patent: Mar. 14, 2023

(54) PACKET INFORMATION ANALYSIS METHOD AND NETWORK TRAFFIC MONITORING DEVICE

(71) Applicant: Chung Yuan Christian University, Taoyuan (TW)

(72) Inventors: Yu-Kuen Lai, Taoyuan (TW); Po-Yu Huang, Taoyuan (TW)

(73) Assignee: Chung Yuan Christian University, Taoyuan (TW)

( * ) Notice: Subject to any disclaimer, the term of this patent is extended or adjusted under 35 U.S.C. 154(b) by 143 days.

(21) Appl. No.: 17/348,769

(22) Filed: Jun. 16, 2021

(65) Prior Publication Data

US 2022/0272016 A1 Aug. 25, 2022

(30) Foreign Application Priority Data

Feb. 22, 2021 (TW) .................................. 110106104

(51) Int. Cl.
*H04L 43/0876* (2022.01)
*H04L 43/062* (2022.01)
*H04L 45/74* (2022.01)

(52) U.S. Cl.
CPC ........ *H04L 43/0876* (2013.01); *H04L 43/062* (2013.01); *H04L 45/74* (2013.01)

(58) Field of Classification Search
CPC ... H04L 43/0876; H04L 43/062; H04L 45/74; H04L 41/14; H04L 43/026
See application file for complete search history.

(56) References Cited

U.S. PATENT DOCUMENTS

| | | | |
|---|---|---|---|
| 2008/0184367 A1 | 7/2008 | McMillan et al. | |
| 2018/0367431 A1* | 12/2018 | Lai | .......... H04L 43/16 |
| 2019/0095478 A1* | 3/2019 | Tankersley | ............ G06F 16/288 |

FOREIGN PATENT DOCUMENTS

| | | |
|---|---|---|
| CN | 104202336 | 12/2014 |
| TW | I541662 | 7/2016 |
| TW | I635726 | 9/2018 |

OTHER PUBLICATIONS

"Office Action of Taiwan Counterpart Application", dated Aug. 26, 2021, p. 1-p. 5.

* cited by examiner

*Primary Examiner* — Kibrom T Hailu
(74) *Attorney, Agent, or Firm* — JCIPRNET (57) ABSTRACT

A packet information analysis method suitable for a device measuring and monitoring network traffic in real-time. The method includes: obtaining network data including a combination of multiple network packet header information; generating an index parameter according to packet header information of a monitored network packet in the network packets; querying at least one reference table according to the index parameter to obtain a first reference value and an offset correction value corresponding to the index parameter in the at least one reference table; obtaining a second reference value according to the first reference value and the offset value; and obtaining an evaluation value according to the second reference value. The evaluation value reflects the distribution status of a measuring and monitoring item in the network packets.

20 Claims, 4 Drawing Sheets

PACKET INFORMATION ANALYSIS METHOD AND NETWORK TRAFFIC MONITORING DEVICE

CROSS-REFERENCE TO RELATED APPLICATION

This application claims the priority benefit of Taiwan application serial no. 110106104, filed on Feb. 22, 2021. The entirety of the above-mentioned patent application is hereby incorporated by reference herein and made a part of this specification.

BACKGROUND

Technical Field

The disclosure relates to a real-time network traffic monitoring technique, and particularly relates to a packet information analysis method and a network traffic monitoring device.

Description of Related Art

Through the progress of information technology, the scale of the Internet has been increasing rapidly. Meanwhile, issues relating to information security on the Internet are drawing more and more attention. Various diversified attacking means as well as a huge amount of attacking traffic have been reported in the backbone network. Such a huge amount of network traffic poses challenges to the conventional analysis method.

Since network traffic is like the flow of water streams, if abnormal traffic cannot be immediately analyzed and identified, the massive amount of network traffic needs to be stored for a post-analysis.

A post-analysis is expensive and inefficient. Damages are usually caused when abnormal traffic is identified in a post-analysis process. Besides, the increasing difficulty in analyzing a massive amount of data suggests a growing dilemma in detecting an abnormal network behavior. In other words, it is difficult to avoid a loss caused by abnormal traffic. The entire network environment becomes unstable, and the network quality deteriorates. As a result, the cost of relevant industries may increase.

Depending on different underlying principles, network attacks may respectively exhibit unique behaviors. As a result, network traffic may display special distribution features. Information entropy reflects the sparseness and concentration degrees of data distribution. A small amount of abnormal traffic may be effectively identified by observing the entropy variation of a specific packet header information item. Therefore, information entropy has been applied in many network abnormality detection systems to supplement abnormal behavior detection methods based on traffic variations.

Currently, the computation of information entropy is conducted using sampling, post-analysis, or sketch algorithms. Sketch algorithms slightly compromise the accuracy of statistical results to an acceptable extent in exchange for higher performance and lower resource consumption. Sketch algorithms include each packet information in the computation without missing any potential abnormal packet and can therefore reflect the influence on information entropy caused by a small amount of abnormal traffic. Sampling also facilitates performance and reduces resource consumption, but may lose the information of a critical packet. Post-analysis yields the most accurate result but is unable to compute information entropy in a real-time manner.

In order to accurately compute information entropy, the numbers of times which the monitoring items respectively appear in an observation interval need to be computed. However, with the traffic at high speed, it is common to have millions of monitoring items, making it not possible to accurately compute information entropy in a real-time manner given the memory and computational resources in the conventional network switches. Thus, it is still challenging to obtain accurate information entropy in a real-time manner in a high-speed network environment.

SUMMARY

The embodiments of the disclosure provide a packet information analysis method and a network traffic monitoring device capable of estimating a distribution status of a monitoring item in network packets by using information entropy and being adjustable in accordance with hardware properties while consuming a limited memory space.

An embodiment of the disclosure provides a packet information analysis method suitable for a network traffic monitoring device. The packet information analysis method includes steps as follows. Network data, including a plurality of network packets, are obtained. An index parameter is generated according to packet information of a first network packet in the network packets. At least one reference table is queried according to the index parameter to obtain a first reference value and an offset correction value corresponding to the index parameter in the at least one reference table. A second reference value is obtained according to the first reference value and the offset correction value. An evaluation value is obtained according to the second reference value. The evaluation value reflects a distribution status of a monitoring item in the network packets.

An embodiment of the disclosure provides a network traffic monitoring device. The network traffic monitoring device includes: a network traffic capturing interface, configured to obtain network data including a plurality of network packets; a storage circuit, configured to store at least one reference table; and a processor, coupled to the network traffic capturing interface and the storage circuit. The processor is configured to: generate an index parameter according to packet header information in the network packets; query at least one reference table according to the index parameter to obtain a first reference value and an offset correction value corresponding to the index parameter in the at least one reference table; obtain a second reference value according to the first reference value and the offset correction value; and obtain an evaluation value according to the second reference value. The evaluation value reflects a distribution status of a monitoring item in the network packets.

Based on the above, in the embodiments of the disclosure, the index parameter is generated according to the packet header information in the network packets, the at least one reference table is queried according to the index parameter, and the evaluation is obtained to reflect the distribution status of the monitoring item in the network packets. Accordingly, complicated mathematical computation is simplified into simple table lookup, and entropy is estimated quickly by using limited memory resources. Thus, the embodiments of the disclosure are capable of providing a computing capability to meet the limited resource constraint for easy implementation for high-speed network analysis and network security monitoring.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Some embodiments of the disclosure will be described in detail in the following with reference to the accompanying drawings. Regarding the reference symbols in the following descriptions, like reference symbols in different drawings are considered as representing like or similar components. The embodiments merely represent some examples of the disclosure and shall not be considered as all the possible embodiments of the disclosure. More specifically, these embodiments are merely examples of the method and device claimed in the disclosure.

Figure 1:
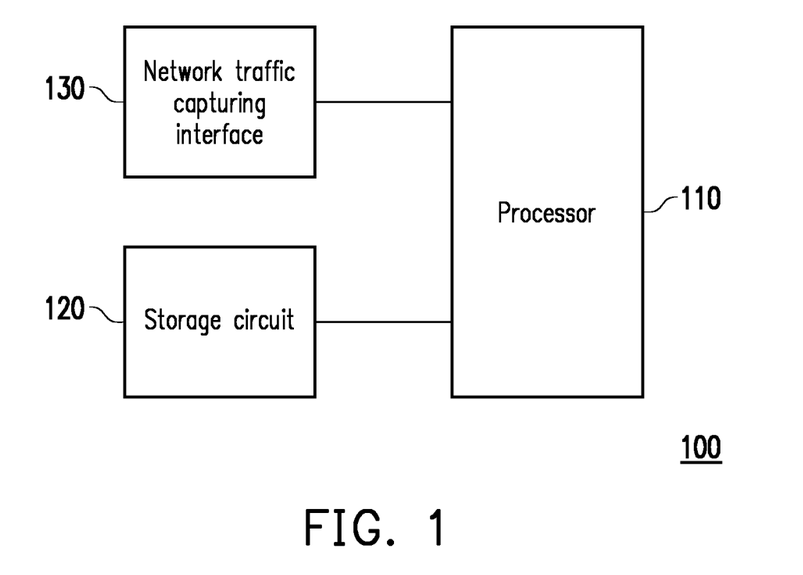
FIG. 1 is a functional block diagram illustrating a network traffic monitoring device according to an embodiment of the disclosure.

FIG. 1 is a functional block diagram illustrating a network traffic monitoring device according to an embodiment of the disclosure. Referring to FIG. 1, a network traffic monitoring device 100 may include a processor 110, a storage circuit 120, and a network traffic capturing interface 130. The network traffic capturing interface 130 may be adapted to obtain network data. The network data may be, for example, network traffic data. For example, the network traffic capturing interface 130 may include a network interface card realized as hardware and/or a network traffic capturing program (or network traffic monitoring program) realized as software. The network data may include multiple network packets.

The storage circuit 120 is adapted to store data. The storage circuit 120, for example, may be any type of static or mobile random access memory (RAM), read-only memory (ROM), flash memory, hard disk drive (HDD), solid state drive (SSD), other similar components, or a combination of the aforementioned components. The storage circuit 120 is adapted to store multiple modules or various application programs executed by the processor 110.

The processor 110 may be coupled to the network traffic capturing interface 130 and the storage circuit 120. The processor 110 is adapted to handle some or all the operations of the network traffic monitoring device 100. For example, the processor 110 may be a central processing unit (CPU), or other programmable general-purpose or specific-purpose micro control units (MCUs), microprocessors, digital signal processors (DSPs), programmable controllers, application specific integrated circuits (ASICs), graphic processing units (GPUs), image signal processors (ISPs), image processing units (IPUs), arithmetic logic units (ALUs), complex programmable logic devices (CPLDs), field programmable gate arrays (FPGAs), other similar components, or a combination of the aforementioned components.

In an embodiment, the storage circuit 120 may be adapted to store at least one reference table. The reference table is provided for the processor 110 to query and obtain a distribution status of at least one monitoring item in the multiple network packets. For example, the monitoring item may include at least one of source IP addresses, target IP addresses, source communication ports, and target communication ports of the network packets.

In an embodiment, the processor 110 may generate an index parameter according to packet information of a network packet (also referred to as first network packet) of the network packets. The packet information may be, for example, header information of a network packet. In an embodiment, in response to the monitoring item being the source IP addresses of the network packets, the packet information of the first network packet may include information of the source IP address of the first network packet. In an embodiment, in response to the monitoring item being the target IP addresses of the network packets, the packet information of the first network packet may include information of the target IP address of the first network packet. In an embodiment, in response to the monitoring item being the source communication ports of the network packets, the packet information of the first network packet may include information of the source communication port of the first network packet. In an embodiment, in response to the monitoring item being the target communication ports of the network packets, the packet information of the first network packet may include information of the target communication port of the first network packet.

In an embodiment, the processor 110 may query the reference table in the storage circuit 120 according to the index parameter. According to the query result, the processor 110 may obtain multiple parameters corresponding to the index parameter in the reference table. For example, the parameters may include a reference value (also referred to as a first reference value) and a correction value (also referred to as offset correction value) corresponding to the reference value. The processor 110 may obtain another parameter (also referred to as second reference value) according to the first reference value and the offset correction value corresponding to the first reference value. Then, the processor 110 may obtain an evaluation value according to the second reference value. The evaluation value may reflect a distribution status of the monitoring item in the network packets.

In an embodiment, the processor 110 may input the packet information (e.g., source IP address, target IP address, source communication port, or target communication port) of the first network packet into a random number generator. The random number generator may be adapted to generate a random number. The processor 110 may obtain the index parameter according to the output of the random number generator. For example, the random number generator may perform hash computation on the packet information of the first network packet and generate the index parameter according to the computation result of the hash computation. Accordingly, the index parameter may exhibit a property of (close to) a random number. Besides, in an embodiment, the processor 110 may also generate the index parameter exhibiting the property of (close to) a random number by using other software/hardware means or other algorithms.

In an embodiment, the index parameter includes a variable (also referred to as first random variable) $U_1$ and a variable $U_2$ (also referred to as second random variable) meeting the notion of uniform distribution. The variables $U_1$ and $U_2$ are both variables greater than 0 and less than 1, and $U_1$ may not be equal to $U_2$. Accordingly, the processor 110 may query the reference table according to the variables $U_1$ and $U_2$ to obtain the first reference value and the offset correction value corresponding to the first reference value.

In an embodiment, the processor 110 may obtain an original reference table. The processor 110 may generate the reference table according to the original reference table and store the reference table in the storage circuit 120. In particular, the total data volume of the reference table may be less than the total data volume of the original reference table. In other words, the processor 110 may generate the reference table with a smaller data volume according to the original reference table, so as to save the storage space of the storage circuit 120 for storing the reference table.

Figure 2:
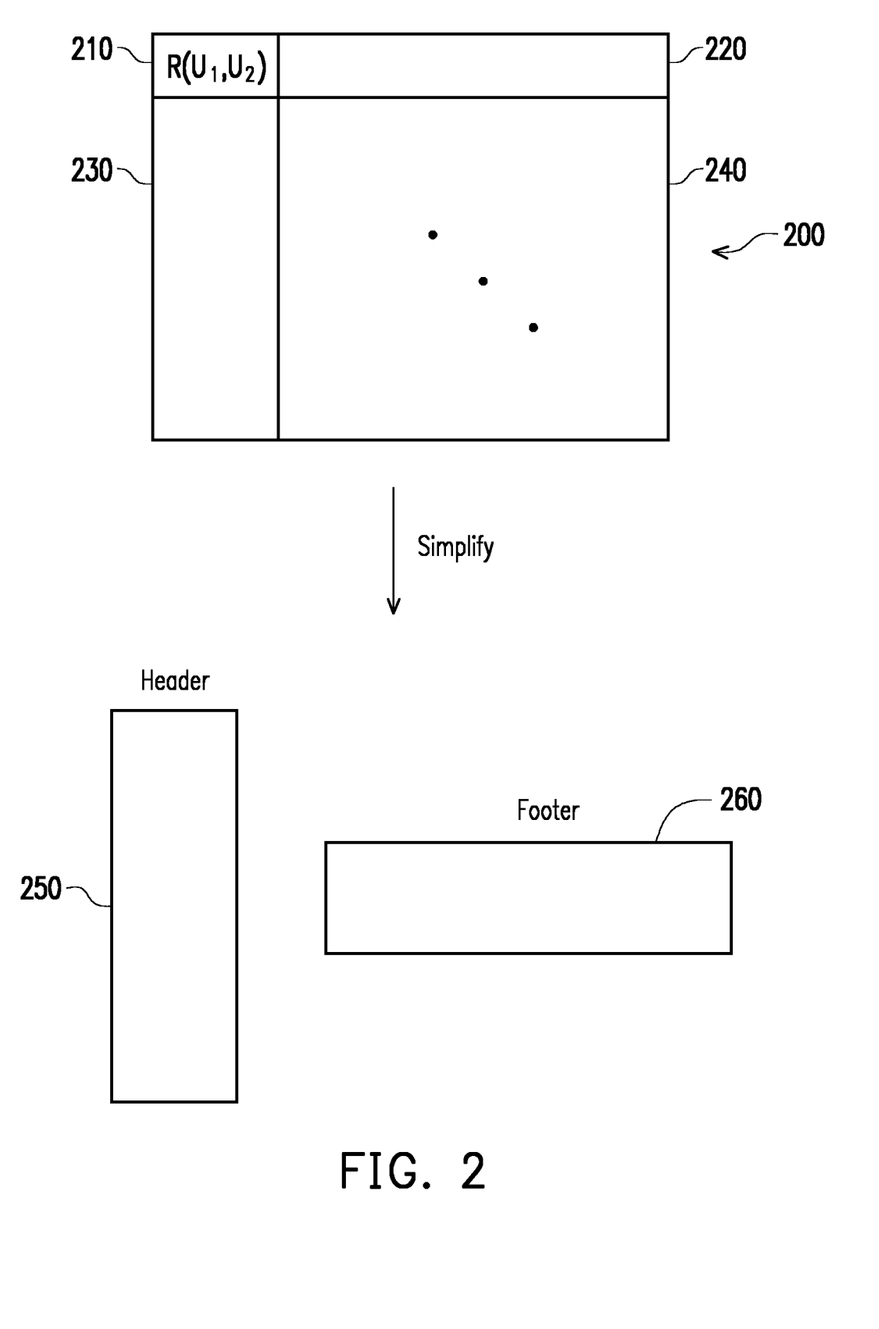
FIG. 2 is a schematic view illustrating generating a reference table according to an original reference table according to an embodiment of the disclosure.

FIG. 2 is a schematic view illustrating generating a reference table according to an original reference table according to an embodiment of the disclosure. Referring to FIG. 2, in an embodiment, the processor 110 may obtain an original reference table 200. In an embodiment, the original reference table 200 may be, for example, downloaded from a remote server or obtained from an arbitrary storage medium (e.g., a flash drive). Or, in an embodiment, the original reference table 200 may be, for example, stored in the storage circuit 120 by default. The processor 110 may generate reference tables 250 and 260 according to the original reference table 200. It should be noted that the total data volumes of the reference tables 250 and 260 are smaller than the total data volume of the original reference table 200.

In an embodiment, the original reference table 200 may include a random mapping table. The original reference table 200 may store an approximate maximally skewed stable distribution value computed from the variables $U_1$ and $U_2$. For example, the approximate maximally skewed stable distribution value computed from the variables $U_1$ and $U_2$ may be represented as $R(U_1, U_2)$, which may also be referred to as a value of an R function. $R(U_1, U_2)$ may be computed by using formulas in the following, for example:

$$W_1 = \pi\left(U_1 - \frac{1}{2}\right)$$

$$W_2 = -\log U_2$$

$$R(U_1, U_2) = \tan(W_1)\left[\frac{\pi}{2} - W_1\right] + \log\left(W_2 \frac{\cos W_1}{\frac{\pi}{2} - W_1}\right)$$

In other words, respective fields 210 and 240 in the original reference table 200 may record all the possible values of $R(U_1, U_2)$. By querying the original reference table 200 using the specific variables $U_1$ and $U_2$, the value of $R(U_1, U_2)$ recorded in the corresponding field in the original reference table 200 may be obtained.

In an embodiment, when the decimal precisions of the variables $U_1$ and $U_2$ are limited, the possible value combinations of the variables $U_1$ and $U_2$ are also limited. Accordingly, the memory space used for the original reference table 200 may be preliminarily reduced. For example, when the decimal precision is set at 4 and all the values in the original reference table 200 are stored in the form of 64-bit double floating-point data, the original reference table 200 may require a memory space of about 2.5 GB.

In an embodiment, after the monitoring item (e.g., the source IP address, the target IP address, the source communication port, or the target communication port of the first network packet) in the network packets is input to the random number generator, the random number generator may output the index parameter including the variables $U_1$ and $U_2$. After comparing the index parameter with the original reference table 200, the value of the R function (i.e., $R(U_1, U_2)$) may be obtained.

In an embodiment, the value distribution of the R function (i.e., $R(U_1, U_2)$) exhibits a specific tendency. For example, the range of the value of the R function (i.e., $R(U_1, U_2)$) is mainly determined by the value of the variable $U_1$. In addition, when the value of the variable $U_1$ is constant and the value of the variable $U_2$ gradually increases, the value of the R function (i.e., $R(U_1, U_2)$) may gradually decrease stepwise In an embodiment, the processor 110 may simplify the information in the original reference table 200 according to the tendency to generate the reference tables 250 and 260. The data volumes of the reference tables 250 and 260 may be significantly less than the data volume of the original reference table 200. In an embodiment, the processor 110 may query the reference tables 250 and 260 according to the index parameter (e.g., variables $U_1$ and $U_2$) to obtain a query result identical or similar to the query result obtained through querying the original reference table 200.

In an embodiment, the reference table 250 may be generated according to the information recorded in a column 230 in the original reference table 200. As an example, the column 230 may be the first or another column in the original reference table 200. In an embodiment, the reference table 260 may be generated according to the information recorded in a row 220 in the original reference table 200. As an example, the row 220 may be the first or another row in the original reference table 200.

In an embodiment, the reference table 250 may record the values of start points (i.e., in the first column 230) of at least some of the rows of the original reference table 200. Therefore, the reference table 250 may also be referred to as the header of the original reference table 200. In an embodiment, the reference table 260 may store the R function values computed by using a certain variable $U_1$ together with a gradually increasing variable $U_2$. Therefore, the reference table 260 may also be referred to as a footer corresponding to the header.

In some embodiments, the value variation tendencies of the R function values recorded in the footers of the respective rows (e.g., the row 220) in the original reference table 200 are similar. That is, these values exhibit a tendency of having a stepwise decrease. Accordingly, one footer (e.g., in the row 220) in the original reference table 200 may be used to approximate other footers in the original reference table 200. Regarding the use of the reference tables 250 and 260, the processor 110 may obtain the initial value of a specific row in the original reference table 200 according to the information of the reference table 250. Then, the processor 10 uses the information in the reference table 260 to perform offset correction (i.e., to fine-tune) the initial value, so as to obtain an actual value or an approximate value of the R function recorded in a field of the specific row of the original reference table 200.

Figure 3:
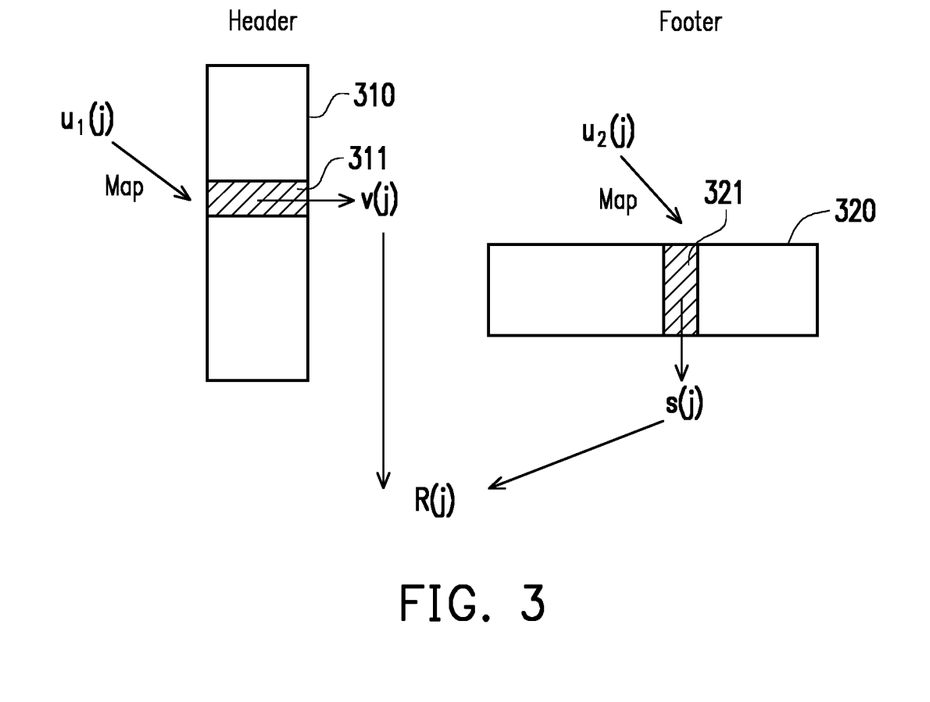
FIG. 3 is a schematic view illustrating querying the reference table according to an index parameter according to an embodiment of the disclosure.

FIG. 3 is a schematic view illustrating querying the reference table according to an index parameter according to an embodiment of the disclosure. Referring to FIG. 3, in an embodiment, the processor 110 may obtain a reference value v(j) (i.e., the first reference value) from a reference table 310 (also referred to as a first reference table) according to an index value $u_1(j)$ (also referred to as a first index value) in the index parameter. In addition, the processor 110 may also obtain a correction value s(j) (i.e., the offset correction value) from a reference table 320 (also referred to as second reference table) according to an index value $u_2(j)$ (also referred to as a second index value) in the index parameter. The processor 110 may correct the reference value v(j) according to the correction value s(j) to obtain a reference value R(j) (i.e., second reference value). The reference table 310 may be the same as or similar to the reference table 250, and the reference table 320 may be the same as or similar to the reference table 260 of FIG. 2. The reference value R(j) may represent the value of the R function (i.e., $R(U_1, U_2)$) obtained by looking up the reference tables 310 and 320 using the index values $u_1(j)$ (i.e., variable $U_1$) and $u_2(j)$ (i.e., variable $U_2$).

In an embodiment, it is assumed that the variable $U_1$ is the index value $u_1(j)$ and the variable $U_2$ is the index value $u_2(j)$. The processor 110 may map the index value $u_1(j)$ to a field 311 in the reference table 310. The processor 110 may obtain the reference value v(j) according to the value recorded in the field 311. Then, the processor 110 may map the index value $u_2(j)$ to a field 321 in the reference table 320. The processor 110 may obtain the correction value s(j) according to the value recorded in the field 321. The processor 110 add or subtract the correction value s(j) to or from the reference value v(j) to obtain the reference value R(j).

In an embodiment, assuming the index value $u_1(j)$=123/16385 and the index value $u_2(j)$=456/16385, the processor 110 may query the reference table 310 according to the index value $u_1(j)$ to obtain a corresponding footer start point value as −135 (i.e., v(j)). Then, the processor 110 may query the reference table 310 according to the index value $u_2(j)$ to obtain the correction value s(j) as 1. Then, the processor 110 may subtract the correction value s(j) from the reference value v(j) to obtain the reference value R(j) as −136 (i.e., −135−1=−136 ).

In an embodiment, when the decimal precision is 4, the header and the footer are each a single-dimensional array with a length of 16384. Therefore, it only requires to store a table in the size of 16384×2=32768 to approximate the entire R function table, and it only takes about a memory space of about 0.125 MB. In other words, compared with the original reference table 200, storing information relating to the computation of the R function by using the reference tables 310 and 320 helps significantly reduce the memory space required for computation.

In an embodiment, in response to the value distribution of the respective fields in the header (e.g., the reference table 310 of FIG. 3), the fields in the header may be further simplified. For example, the total number of fields in the header may be simplified from 16384 to 338. The 338 values may approximately represent or be similar to the value distribution of the original 16384 values (i.e., the reference values v(j) of FIG. 3).

In an embodiment, in response to the value distribution of the respective fields in the footer (e.g., the reference table 320 of FIG. 3), the fields in the footer may be further simplified. For example, the total number of fields in the footer may be simplified from 16384 to 13. The 13 values may approximately represent or similar to the value distribution of the original 16384 values (i.e., the reference values (j) of FIG. 3).

Figure 4:
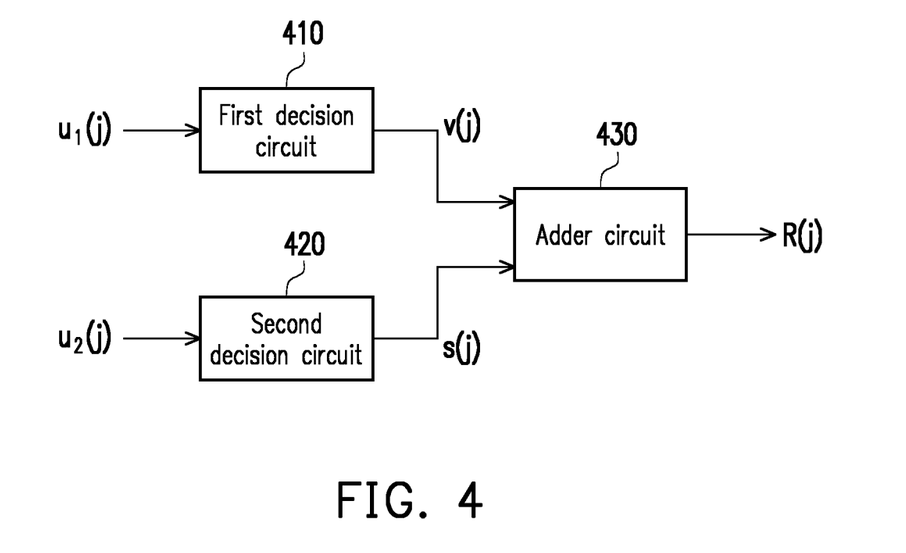
FIG. 4 is a block diagram illustrating a first decision circuit, a second decision circuit, and an adder circuit according to an embodiment of the disclosure.

FIG. 4 is a block diagram illustrating a first decision circuit, a second decision circuit, and an adder circuit according to an embodiment of the disclosure. Referring to FIG. 4, in an embodiment, the network traffic monitoring device 100 may further include a decision circuit 410 (also referred to as first decision circuit), a decision circuit (also referred to as second decision circuit), and an adder circuit 430. The decision circuit 410, the decision circuit 420, and the adder circuit 430 are all coupled to the processor 110.

In an embodiment, the processor 110 may input the index value $u_1(j)$ to the decision circuit 410. The processor 110 may read the reference value v(j) from a table position 311 in the reference table 310 according to the output of the decision circuit 410. For example, the decision circuit 410 may determine that the index value $u_1(j)$ falls within a numerical range and instruct to read the reference value v(j) from the table position 311 according to the numerical range. The processor 110 may also input the index value $u_2(j)$ to the decision circuit 420. The processor 110 may read the correction value s(j) from a table position 321 in the reference table 320 according to the output of the decision circuit 420. For example, the decision circuit 410 may determine that the index value $u_2(j)$ falls within a numerical range and instruct to read the correction value s(j) from the table position 321 according to the numerical range.

In an embodiment, the processor 110 is adapted to input the reference value v(j) and the correction value s(j) to the adder circuit 430. For example, the adder circuit 430 may execute a logic operation relating to R(j)=v(j)−s(j). The processor 110 may obtain the reference value R(j) according to the output of the adder circuit 430. In an embodiment, the decision circuit 410, the decision circuit 420, and the adder circuit 430 of FIG. 4 may also be implemented in the processor 110 or realized as software. The disclosure is not particularly limited in this regard.

In an embodiment, the processor 110 may obtain an evaluation value according to the reference value R(j) (i.e., second reference value). The evaluation value may reflect the distribution status of the monitoring item in the network packets. In an embodiment, the evaluation value may include an estimated value of entropy relating to the monitoring item in the network packets. For example, when the monitoring item is the source IP addresses of the network packets, the evaluation value may reflect the distribution status of the source IP addresses of the network packets.

In an embodiment, the processor 110 may obtain the evaluation value according to the following formula:

$$\hat{H}'(O) = -\log\left[k^{-1}\sum_{j=1}^{k}\exp(y_j)\right]$$

In the above formula, the parameter $y_j$ may be obtained according to the reference value R(j), and the parameter $\hat{H}'(O)$ may be used to represent the estimated value of the entropy relating to the network packets. In correspondence with the $j^{th}$ index parameter, the parameter $y_j$ may be iteratively calculated according to a formula as follows:

$$y_j = y_j + R(j) \times d_t$$

$$y_j = y_j / Cnt$$

In the above formulas, $d_t=1$ represents that a network packet (i.e., the first network packet) is received at a time t, and Cnt represents the total number of network packets received within a monitoring period.

Figure 5:
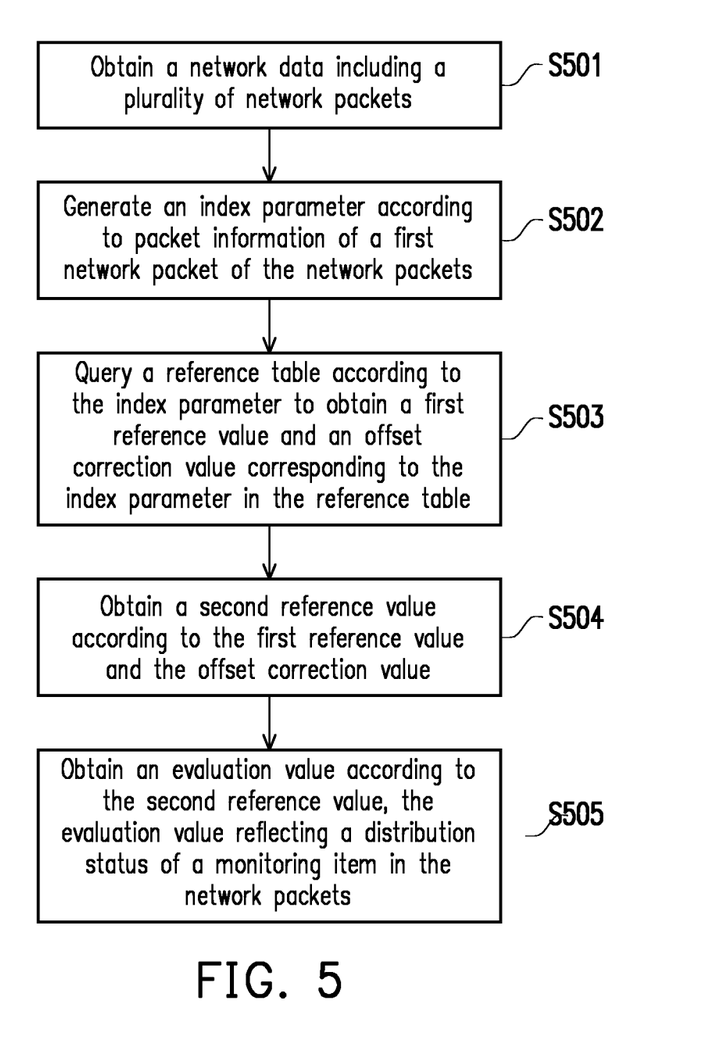
FIG. 5 is a flowchart illustrating a packet information analysis method according to an embodiment of the disclosure.

FIG. 5 is a flowchart illustrating a packet information analysis method according to an embodiment of the disclosure. Referring to FIG. 5, the method of the embodiment is suitable for the network traffic monitoring device 100 shown in FIG. 1. In the following, the detailed steps of the embodiment of the disclosure are described.

In Step S501, network data including multiple network packets are obtained. In Step 502, an index parameter is generated according to packet information of a first network packet in the network packets. In Step 503, at least one reference table is queried according to the index parameter to obtain a first reference value and an offset correction value corresponding to the index parameter in the reference table. In Step 504, a second reference value is obtained according to the first reference value and the offset correction value. In Step 505, an evaluation value is obtained according to the second reference value. The evaluation value reflects a distribution status of a monitoring item in the network packets.

In the embodiments of the disclosure, the property that the start points of the respective footers are different but the patterns are similar is utilized. Therefore, the entire table of R function output values can be approximated by recording one set of headers and one set of footers. Besides, the data of the footers and the headers exhibit the properties of having been ordered and having fewer varieties. Therefore, when implemented with hardware, by using a threshold determination circuit (e.g., the decision circuits 410 and 420 of FIG. 4) together with a small table, the same result can be rendered while fewer storage resources are consumed. After the simplification of the headers and the footers, it only requires two threshold determination circuits and a table in a size of 351 fields (13+338), which is equivalent to a memory size of about 3.42 KB, to estimate the entropy of network traffic.

In view of the foregoing, the packet information analysis method and the network traffic monitoring device according to the embodiments of the disclosure are capable of meeting the limited resource constraint for easy implementation for high-speed network analysis and network security monitoring, and can quickly estimate entropy of the network traffic while consuming limited memory resources.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A packet information analysis method, suitable for a network traffic monitoring device, the packet information analysis method comprising:
   obtaining network data comprising a plurality of network packets;
   generating an index parameter according to packet information of a first network packet in the network packets;
   querying at least one reference table according to the index parameter to obtain a first reference value and an offset correction value corresponding to the index parameter in the at least one reference table;
   obtaining a second reference value according to the first reference value and the offset correction value; and
   obtaining an evaluation value according to the second reference value, wherein the evaluation value reflects a distribution status of a monitoring item in the network packets.

2. The packet information analysis method as claimed in claim 1, wherein the monitoring item comprises at least one of a source Internet Protocol (IP) address, a target IP address, a source communication port, and a target communication port.

3. The packet information analysis method as claimed in claim 1, wherein the packet information of the first network packet comprises at least one of a source IP address of the first network packet, a target IP address of the first network packet, a source communication port of the first network packet, and a target communication port of the first network packet.

4. The packet information analysis method as claimed in claim 1, wherein generating the index parameter according to the packet information of the first network packet in the network packets comprises:
   inputting the packet information of the first network packet to a random number generator; and
   obtaining the index parameter according to an output of the random number generator.

5. The packet information analysis method as claimed in claim 1, wherein querying the at least one reference table according to the index parameter to obtain the first reference value and the offset correction value corresponding to the index parameter in the at least one reference table comprises:
   obtaining the first reference value from a first reference table of the at least one reference table according to a first index value of the index parameter; and
   obtaining the offset correction value from a second reference table of the at least one reference table according to a second index value of the index parameter.

6. The packet information analysis method as claimed in claim 5, wherein obtaining the first reference value from the first reference table of the at least one reference table according to the first index value of the index parameter comprises:
   inputting the first index value to a first decision circuit; and
   reading the first reference value from a first table position in the first reference table according to an output of the first decision circuit,
   wherein obtaining the offset correction value from the second reference table of the at least one reference table according to the second index value of the index parameter comprises:
   inputting the second index value to a second decision circuit; and
   reading the offset correction value from a second table position in the second reference table according to an output of the second decision circuit.

7. The packet information analysis method as claimed in claim 1, wherein obtaining the second reference value according to the first reference value and the offset correction value comprises:
   correcting the first reference value according to the offset correction value to obtain the second reference value.

8. The packet information analysis method as claimed in claim 7, wherein correcting the first reference value according to the offset correction value to obtain the second reference value comprises:
   inputting the first reference value and the offset correction value to an adder circuit; and obtaining the second reference value according to an output of the adder circuit.

9. The packet information analysis method as claimed in claim 1, further comprising:
obtaining an original reference table; and
generating the at least one reference table according to the original reference table, wherein a total data volume of the at least one reference table is less than a total data volume of the original reference table.

10. The packet information analysis method as claimed in claim 1, wherein obtaining the evaluation value according to the second reference value comprises:
obtaining the evaluation value according to a formula as follows:

$$\hat{H}'(O) = -\log [k^{-1} \Sigma_{j=1}^{k} \exp(y_j)],$$

wherein a parameter $y_j$ corresponds to the second reference value, and a parameter $\hat{H}'(O)$ corresponds to the evaluation value.

11. A network traffic monitoring device, comprising:
a network traffic capturing interface, configured to obtain network data comprising a plurality of network packets;
a storage circuit, configured to store at least one reference table; and
a processor, coupled to the network traffic capturing interface and the storage circuit,
wherein the processor is configured to:
generate an index parameter according to packet information of a first network packet in the network packets;
query at least one reference table according to the index parameter to obtain a first reference value and an offset correction value corresponding to the index parameter in the at least one reference table;
obtain a second reference value according to the first reference value and the offset correction value; and
obtain an evaluation value according to the second reference value, wherein the evaluation value reflects a distribution status of a monitoring item in the network packets.

12. The network traffic monitoring device as claimed in claim 11, wherein the monitoring item comprises at least one of a source Internet Protocol (IP) address, a target IP address, a source communication port, and a target communication port.

13. The network traffic monitoring device as claimed in claim 11, wherein the packet information of the first network packet comprises at least one of a source IP address of the first network packet, a target IP address of the first network packet, a source communication port of the first network packet, and a target communication port of the first network packet.

14. The network traffic monitoring device as claimed in claim 11, wherein an operation of generating the index parameter according to the packet information of the first network packet in the network packets comprises:
inputting the packet information of the first network packet to a random number generator; and
obtaining the index parameter according to an output of the random number generator.

15. The network traffic monitoring device as claimed in claim 11, wherein an operation of querying the at least one reference table according to the index parameter to obtain the first reference value and the offset correction value corresponding to the index parameter in the at least one reference table comprises:
obtaining the first reference value from a first reference table of the at least one reference table according to a first index value of the index parameter; and
obtaining the offset correction value from a second reference table of the at least one reference table according to a second index value of the index parameter.

16. The network traffic monitoring device as claimed in claim 15, further comprising:
a first decision circuit, coupled to the processor; and
a second decision circuit, coupled to the processor,
wherein the processor is configured to input the first index value to the first decision circuit and reads the first reference value from a first table position in the first reference table according to an output of the first decision circuit, and
the processor is configured to input the second index value to the second decision circuit and reads the offset correction value from a second table position in the second reference table according to an output of the second decision circuit.

17. The network traffic monitoring device as claimed in claim 11, wherein an operation of obtaining the second reference value according to the first reference value and the offset correction value comprises:
correcting the first reference value according to the offset correction value to obtain the second reference value.

18. The network traffic monitoring device as claimed in claim 17, further comprising:
an adder circuit, coupled to the processor,
wherein the processor is configured to input the first reference value and the offset correction value to the adder circuit, and obtain the second reference value according to an output of the adder circuit.

19. The network traffic monitoring device as claimed in claim 11, wherein the processor is further configured to:
obtain an original reference table; and
generate the at least one reference table according to the original reference table, wherein a total data volume of the at least one reference table is less than a total data volume of the original reference table.

20. The network traffic monitoring device as claimed in claim 11, wherein an operation of obtaining the evaluation value according to the second reference value comprises:
obtaining the evaluation value according to a formula as follows:

$$\hat{H}'(O) = -\log [k^{-1} \Sigma_{j=1}^{k} \exp(y_j)],$$

wherein a parameter $y_j$ corresponds to the second reference value, and a parameter $\hat{H}'(O)$ corresponds to the evaluation value.

* * * * *